Figure 1:
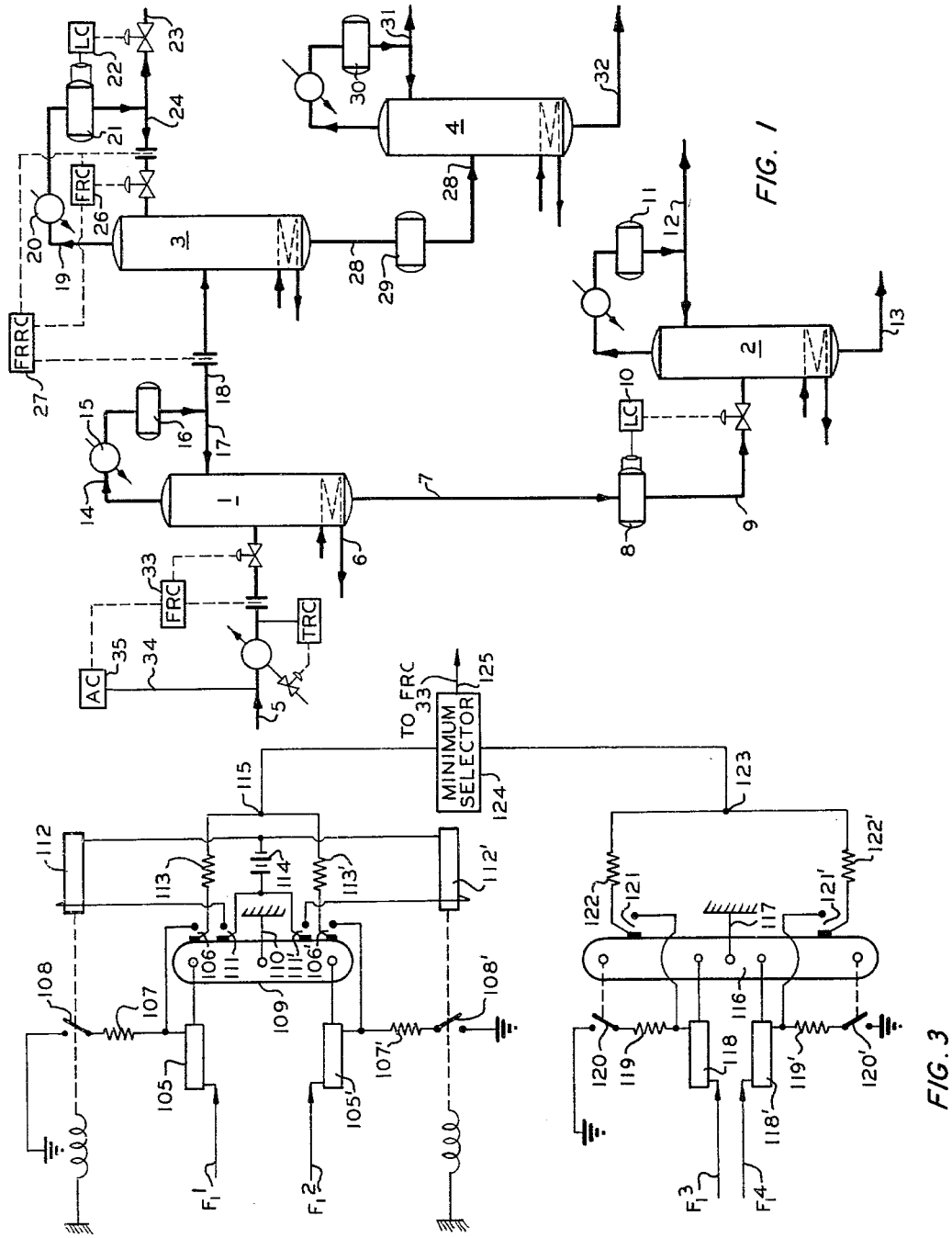

Jan. 18, 1966  H. L. WALKER  3,230,154
FEED FLOW RATE CONTROL IN A PLURAL SEPARATION SYSTEM
Filed Nov. 14, 1961  4 Sheets-Sheet 1

INVENTOR.
H.L. WALKER
BY
Young & Quigg
ATTORNEYS

INVENTOR.
H.L. WALKER
BY
ATTORNEYS

United States Patent Office

3,230,154
Patented Jan. 18, 1966

3,230,154
FEED FLOW RATE CONTROL IN A PLURAL
SEPARATION SYSTEM
Harry L. Walker, Bartlesville, Okla., assignor to Phillips
Petroleum Company, a corporation of Delaware
Filed Nov. 14, 1961, Ser. No. 152,193
20 Claims. (Cl. 203—40)

This invention relates to control of separations. In one of its aspects, this invention relates to method and apparatus for controlling serially-connected separation zones. In another aspect, the invention relates to method and apparatus for control of serially-connected separation zones by determining, in response to analysis of a fluid mixture to be separated and further in response to predetermined physical characteristics of the separation zones, which of the zones will limit throughput rate of the fluid mixture, and controlling throughput rate in response to the determining. In still another aspect, the invention relates to method and apparatus for controlling serially-connected distillation columns.

Many industrial processes are dependent upon separation of mixtures; in many instances, the mixture will comprise several components. Separation of such mixtures is often best effected by a plurality of serially-connected separators, i.e., separators wherein at least one separated stream from one separator is passed for further separation to a second separator. Because the feed or initial composition of such a mixture can vary, the load which is carried by a given separator in the train will also vary; it is readily seen then that physical limitations of the equipment in the train, such as simple throughput capacity, will result in a shifting of the "bottleneck" in the train from one separator to another as the feed composition varies. This phenomenon has, in the past, resulted in such separation trains being operated at only that capacity which is not expected to exceed the capacity of the "bottleneck" separator for the range of feed expected, with a resulting decrease in the throughput efficiency when feed composition is at other than its "worst" condition. Another alternate solution has been to provide large surge zones between each two stages of separation to allow accumulation during "peak" periods, with the resulting equipment and maintenance expenses.

Accordingly, it is an object of this invention to perform serial separations without the necessity of operating at a uniformly low rate, and without the necessity of providing large surge zones between stages of separation. It is another object of this invention to provide method and apparatus for controlling serial separations whereby the "bottleneck" separator, whichever it might be, is operated at its maximum throughput capacity. It is still another object of this invention to provide method and apparatus for operating serial separators at maximum throughput capacity with regard to feed composition.

Figure 2:
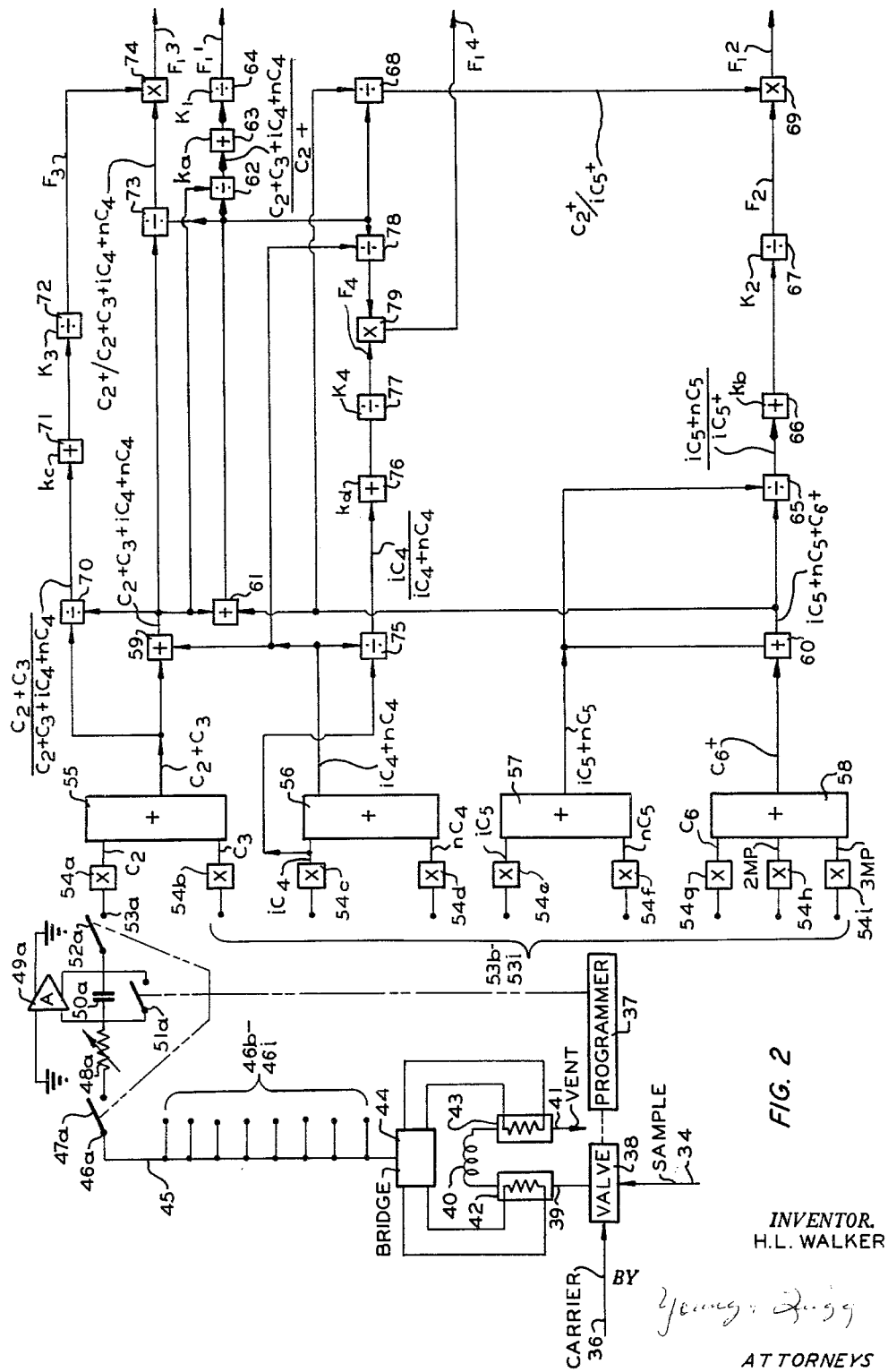
Figure 4:
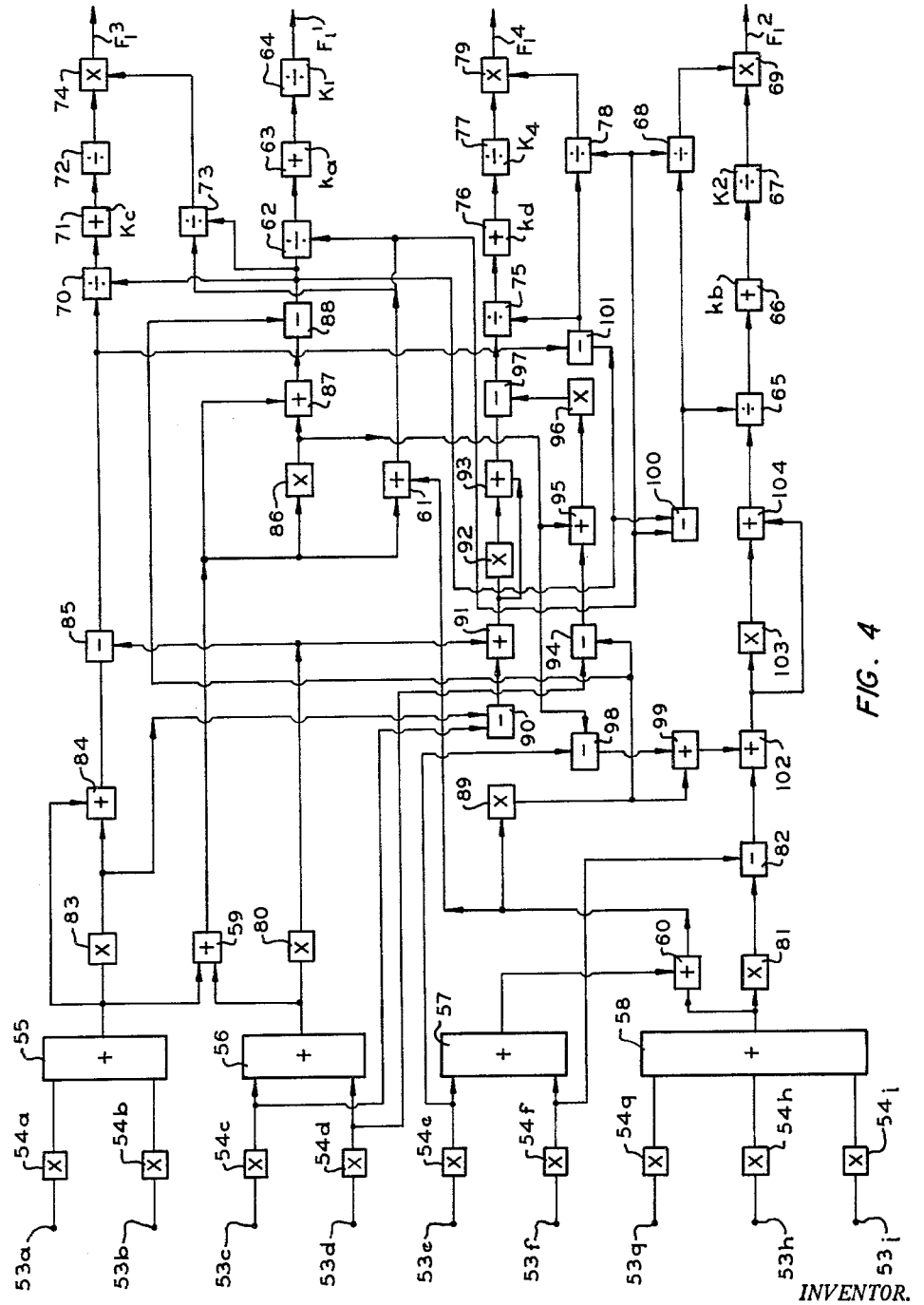
Figure 5:
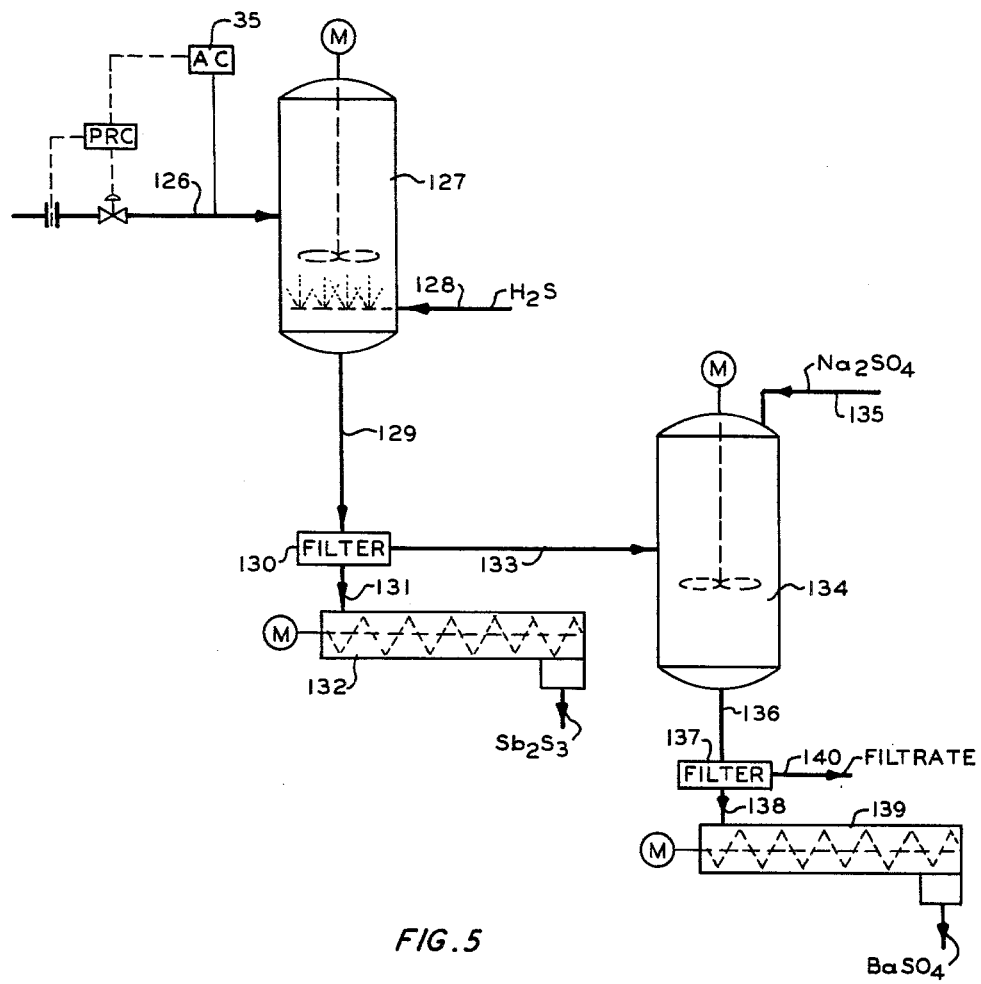

Other aspects, objects and the several advantages of my invention will become apparent from a study of this disclosure, the appended claims, and the drawing in which: FIGURE 1 is a flow diagram of my invention as applied to a fractional distillation process; FIGURE 2 is a schematic of one embodiment of a computer useful in the practice of my invention; FIGURE 3 is a schematic of two embodiments of an output selector useful in the practice of my invention; and FIGURE 4 is a schematic of another embodiment of a computer useful in the practice of my invention. FIGURE 5 is a flow diagram of my invention as applied to a filtration process.

According to the invention, serially-connected separators are operated by analyzing the feed to the first separator and then controlling the rate of the feed in response to a computation based on the analysis and on known physical limitations of the separators so as to maintain that separator which is the "bottleneck" for the particular feed composition involved operating at its maximum throughput. This is accomplished by determining from the analysis the fraction or amount of total feed which will, according to the known physical characteristics of the separators involved, be processed by each separator, by adjusting each of these determinations by a factor representing what amount of the particular feed will load that separator, by then selecting the minimum one of these adjusted rates, and by then controlling initial feed rate to the process in response to the thus-selected rate. Once the concepts of my invention are understood, its applicability to all types of separational processes will become apparent.

For a more complete understanding of my invention, reference is now made to FIGURE 1 wherein is depicted a fractional distillation process controlled according to my invention. The process comprises four fractional distillation columns 1, 2, 3 and 4. Initial feed is passed to column 1 by way of conduit 5 and is separated into an overhead fraction and a kettle fraction. The kettle fraction is further separated into a light and a heavy fraction by column 2. The overhead fraction is further separated into a light and a heavy fraction in column 3, and the latter fraction is further separated into a light and a heavy fraction by column 4. A sample of the feed in conduit 5 is passed by way of conduit 34 to analyzer-controller 35 which is shown in detail in FIGURES 2, 3 and 4 and will be discussed in conjunction therewith. The output of analyzer 35 is representative of that feed rate of material of composition then prevailing which will suffice to load to maximum throughput whichever column is the "bottleneck" for the feed composition then prevailing. Accordingly, this output of analyzer 35 is used to reset the set point of flow controller 33 which, with its associated flow measuring orifice and motor valve, serves to control feed rate to the process. A temperature controller and heat exchanger are shown in conduit 5 for the purpose of adjusting feed temperature as desired. The fractional distillation columns are provided with suitable heating means as shown by the numeral 6 on column 1. Heavy components are passed by way of conduit 7 to a small surge zone 8 and then by way of conduit 9 to column 2. When a surge zone such as 8 is used, flow therefrom can be controlled, for example, by a liquid level controller 10 and its associated motor valve. Overhead vapors from column 2 are condensed and passed to an accumulation zone 11; a portion is returned to the column as reflux, and a second portion is withdrawn by way of conduit 12 as product. A kettle product is withdrawn by way of conduit 13.

Overhead vapors from column 1 are passed by way of conduit 14 to a condenser 15 and, thence, to an accumulator 16. A portion of the condensate is returned to the column as reflux by way of conduit 17, and a second portion is withdrawn as overhead product by way of conduit 18 and passed to column 3 for further separation.

A control system useful in the practice of my invention is shown in conjunction with column 3, and it is to be understood that this or other control systems can also be applied to columns 1, 2 and 4. Overhead vapors from column 3 are passed by way of conduit 19 and condenser 20 to an accumulator 21, from which a first portion of condensate is returned to the column by way of conduit 24 and a second portion withdrawn by way of conduit 23 as overhead product. Rate of product withdrawal through conduit 23 is controlled by liquid level controller 22 and its associated motor valve. Reflux rate through conduit 24 is controlled by flow controller 26 and its associated motor valve and flow measuring orifice. The set point of controller 26 is manipulated by flow ratio controller 27, which measures feed rate in conduit 18 and reflux rate in conduit 24, and resets the index point of controller 26 to maintain the ratio of reflux to feed constant.

Kettle product from column 3 is passed by way of conduit 28 to a small surge zone 29 which can be controlled in a manner similar to zone 8. The kettle product is then further separated in column 4 with its associated overhead condenser and accumulator zone 30, overhead product line 31, and kettle product line 32.

In operation, a multi-component feed mixture is passed to the system by way of conduit 5. Such a feed mixture can comprise, for example, a mixture of ethane, propane, i- and n-butane, i- and n-pentanes, hexanes, and small amounts of heavier components. Column 1 is operated to produce primarily butanes and lighter overhead, and pentanes and heavier in the kettle. Column 2 is operated to produce mixed pentanes overhead, and hexanes and heavier as kettle product. Column 3 is operated to produce ethane and propane overhead, and mixed butanes as kettle product. Column 4 is operated to produce i-butane overhead, and n-butane as kettle product. It can be seen that as the feed composition varies, the load on the various columns will shift. For example, an increase in butanes content could overload column 4. In such an instance, according to the practice of my invention, analysis of the feed and the subsequent computations will result in controlling the feed rate to column 1 at such a rate that column 4, which is now the "bottleneck," will be operating at the maximum rate which it can process as determined by its known physical limitations. In order to more fully explain the operation of my invention, reference is now made to FIGURE 2, which depicts schematically one embodiment of analyzer-controller 35.

In FIGURE 2, there are shown a chromatographic analyzer, analyzer output signal storing means, and means for computing in response to the analysis which column will be the "bottleneck" for the prevailing feed composition. The chromatographic analyzer comprises numerals 34 through 45. A sample of feed removed from conduit 5 (FIGURE 1) is passed by way of conduit 34 to a valve 38. This valve 38 serves to introduce a measured volume of sample into a carrier gas such as helium, introduced by way of conduit 36, on a time basis as controlled by programmer 37. The mixture of sample and carrier gas is passed by way of conduit 39 and column 40 to a vent 41. Column 40 can comprise a tube filled with solids adapted to selectively retard the passage therethrough of the various feed components, as is known in the art. Interposed in conduits 39, 40 and 41 are measuring elements 42 and 43, which can comprise temperature-sensitive resistors such as thermistors. Elements 42 and 43 comprise two arms of a bridge circuit 44. Thus, the output 45 of the bridge circuit will reflect the difference in composition between sample mixture in conduit 39 and column output in conduit 41 and, accordingly, after suitable attenuation, fraction of each component in the sample.

The output of the analyzer is stored on signal storing means comprising numerals 46 through 53. For the sake of simplicity, only one signal storing device is shown, connected between terminals 46a and 53a. It is to be understood that similar devices are connected in parallel between terminals 46b–i and 53b–i, one for each component of interest. The storage means comprises terminal 46a, switch 47a, attenuating resistor 48a, parallel-connected amplifier 49a, storage condenser 50a, switch 51a, output switch 52a, and output terminal 53a. Switches 47a, 51a, and 52a are operated on a time basis by programmer 37. In operation, a voltage proportional to the instantaneous value of the analyzer output in conductor 45 is passed by way of terminal 46a, switch 47a, and resistor 48a to an input terminal of amplifier 49a and condenser 50a, switches 51a and 52a being open. Amplifier 49a is a conventional high-gain D.C. amplifier whose output voltage $E_1$ is represented by the expression $$E_1 = \frac{1}{T}\int_0^t E\,dT$$

where $t$ is time and $T$ is the time constant of capacitor 50a and its associated circuit, and thus constitutes an integration circuit. After passage of the component of interest past detector 43, switch 51a is opened by programmer 37. The operation thus far results in storage of a signal on condenser 50a which is proportional to the amount of the given component in the sample. Programmer 37 then performs a similar operation sequentially with each of the several signal storing means, with the result that there is stored a signal on each condenser 50a–50i proportional to the mol fraction of each component of interest present in the sample. Switches 52a–52i are then closed simultaneously by programmer 37, resulting in performance of the computations which will be described. Switches 51a–51i are then closed momentarily by the programmer 37 to discharge the condensers and prepare the signal storing means for a subsequent cycle.

The computer of FIGURE 2 comprises the remaining portion of the figure. In order to understand the operation of the computer, it will first be necessary to consider the equations solved thereby, which are based on simple material balance considerations. Considering any fractional distillation column, it can be stated that:

(1) $$K = L + OHP$$

where $K$=mols of total vapor going overhead per unit time, $L$=mols of reflux per unit time, and $OHP$=mols of overhead product per unit time, or (2) $$K = G\left(\frac{L}{F} + \frac{OHP}{F}\right)$$

multiplying and dividing the right side of Equation 1 by F, mols of feed per unit time, or (3) $$F = \frac{K}{\frac{L}{F} + \frac{OHP}{F}}$$

restating Equation 2.

Further, considering two fractional distillation columns in series wherein the second, column $y$, takes as its feed one of the product streams of the first, column $x$, it can be stated that:

(4) $$F_x = F_x$$

or (5) $$F_x = F_y\left(\frac{F_x}{F_y}\right)$$

by multiplying and dividing the right side of Equation 4 by $F_y$.

Thus, considering two columns in series, it can be stated by substituting Equation 3 into Equation 5, for $F_y$ that:

(6) $$F_x = \frac{K_y}{\frac{L_y}{F_y} + \frac{OHP_y}{F_y}} \cdot \frac{F_x}{F_y}$$

It can be further stated that the quantities $K$ and $L/F$, and $K_y$ and $L_y/F_y$, in Equations 3 and 6 respectively, can be considered constant for a given fractional distillation column operating on given feed components; these quantities are determined by physical limitations of the given fractional distillation column, such as the diameter of the overhead vapor line, etc., and the degree of separation desired. Equations 3 and 6 can thus be restated as:

$$(7) \quad F = \frac{K}{k + \frac{OHP}{F}}$$

where K and k are constants for the given instance, and $$(8) \quad F_x = \frac{K_y}{k_y + \frac{OHP_y}{F_y}} \cdot \frac{F_x}{F_y}$$

where $K_y$ and $k_y$ are constants for the given instance.

These constants can be determined, for example, by a material balance on the actual piece of equipment under consideration. Considering for a moment Equation 8, it is seen that there is provided an equation for determining feed rate to a first column, $x$, in terms of physical limitations and feed and overhead product compositions of a second column in series therewith, column $y$. The specific equations solved by the computer in FIGURE 2 will now be set forth in terms of the fractionation columns of FIGURE 1 and in terms of the specific separation discussed in conjunction therewith.

$$(9) \quad F_1{}' = \frac{K_1}{k_a + \frac{C_2 + C_3 + iC_4 + nC_4}{C_2 +}}$$

where $k_a$ and $K_1$ are constants of column 1, $C_2$, $C_3$, etc. are conventional notation for amounts of ethane, propane, etc., respectively, and $F_1{}'$ is the feed rate to column 1 which kill "load" column 1 in accordance with the physical limitations as discussed, by substitution in Equation 7.

$$(10) \quad F_1{}^2 = \frac{K_2}{k_b + \frac{iC_5 + nC_5}{iC_5 +}} \cdot \frac{C_2 +}{iC_5 +}$$

where $k_b$ and $K_2$ are constants of column 2 and $F_1{}^2$ is the feed rate to column 1 which will "load" column 2 in accordance with its physical limitations, by substitution in Equation 8.

$$(11) \quad F_1{}^3 = \frac{K_3}{k_c + \frac{C_2 + C_3}{C_2 + C_3 + iC_4 + nC_4}} \cdot \frac{C_2 +}{C_2 + C_3 + iC_4 + nC_4}$$

where $F_1{}^3$ is the feed rate to column 1 which will "load" column 3 in accordance with the limitations of column 3, $k_c$ and $K_3$, by substitution in Equation 8.

$$(12) \quad F_1{}^4 = \frac{K_4}{k_d + \frac{iC_4}{iC_4 + nC_4}} \cdot \frac{C_2 +}{iC_4 + nC_4}$$

where $F_1{}^4$ is the feed rate to column 1 which will "load" column 4 in accordance with the limitations of column 4, $k_d$ and $K_4$, by substitution in Equation 8.

Having set forth the four equations, 9 through 12, which are solved by the computer of FIGURE 2, it remains only to state that the various arithmetical operations of addition, multiplication, and division which are performed by item numbers 54 through 79 and are indicated thereon by the appropriate mathematical symbol can be accomplished, for example, by standard electrical or pneumatic components. Suitable electrical devices are described as follows:

Adder: Applications Manual by Philbrick OCTAL Plug-In Computing Amplifiers, page 10, parts 1.1 and 1.2;
Subtractor (to be used in FIGURE 4): supra, page 16, part 2.2;
Multiplier and divider: Electron Analog Computer, Korn and Korn, McGraw-Hill (1952), FIGURE 3, page 213.

It should further be stated that multipliers 54a through 54i convert mols of the component into gallons by multiplying by the appropriate constant. The four outputs of the computer of FIGURE 2, $F_1{}'$, $F_1{}^2$, $F_1{}^3$, and $F_1{}^4$, thus comprise signals representing that flow rate of feed to column 1 (of the analyzed composition) which will suffice to "load" columns 1, 2, 3 and 4, respectively. These four outputs comprise the inputs to the signal selector of FIGURE 3.

In FIGURE 3 is shown a signal selector which comprises three minimum selectors cascaded as shown. Inputs $F_1{}'$ and $F_1{}^2$ are fed to one embodiment of a minimum selector, while inputs $F_1{}^3$ and $F_1{}^4$ are fed to a second embodiment of a minimum selector. The first comprises matched solenoids 105 and 105′, fixed-movable contact pairs 106 and 106′, and 111 and 111′, dropping resistors 107 and 107′, switches 108 and 108′ mechanically linked to springs and to solenoids 112 and 112′ as shown, balance beam 109 on pivot 110, dropping resistors 113 and 113′, voltage source 114, and output terminal 115. In operation, it will be assumed that input signal $F_1{}^2$ is larger in magnitude than input signal $F_1{}'$. This results in solenoid 105′ overpowering matched solenoid 105 with consequent movement of the lower end of balance beam 109 to the left about its pivot 110. Contact points 106 and 111 are thereby closed, while contacts 106′ and 111′ are opened. Closure of contacts 111 results in applying voltage 114 across solenoid 112, which opens switch 108. Closure of contacts 106 allows passage of input signal $F_1{}'$, the smaller of the two, through solenoid 105, contacts 106, and resistor 113 to output terminal 115. Opening of contacts 111′ results in de-energizing solenoid 112′, which closes switch 108′. Input signal $F_1{}^2$, the larger of the two, is thus prevented from reaching output terminal 115 by open contacts 106′, and is instead passed to ground by way of solenoid 105′, resistor 107′, and switch 108′. The smaller of the two inputs is, therefore, available at output terminal 115.

A second embodiment of a suitable minimum selector is shown as operating on inputs $F_1{}^3$ and $F_1{}^4$, and comprises matched solenoids 118 and 118′, dropping resistors 119 and 119′, balance beam 116 and its associated pivot 117, beam-actuated switches 120 and 120′, fixed-movable contact pairs 121 and 121′, dropping resistors 122 and 122′, and output terminal 123. This minimum selector differs from the one formerly described only in that grounding switches 120 and 120′ are mechanically actuated by beam 116 rather than by solenoids 112 and 112′, thus eliminating the need of those latter solenoids, contacts 111 and 111′, the voltage source 114. The net result is, of course, that the smaller of the two signals $F_1{}^3$ and $F_1{}^4$ will be passed to output terminal 123 while the larger is passed to ground. Outputs 115 and 123, representing the smaller of the two pairs of inputs $F_1{}'$, $F_1{}^2$ and $F_1{}^3$, $F_1{}^4$, are then passed to a third minimum selector indicated as 124. The output of this selector is the smallest of the four original inputs, and is passed by way of conductor 125 to reset the index point of controller 33 in FIGURE 1, previously described.

It will thus be seen that there has been described method and means for determining, in response to a feed analysis, which column will have the lowest capacity in terms of that specific feed (i.e., will be the "bottleneck") and for controlling feed rate to the separation process in response to that determination.

Considering again Equations 7 and 8, and consequently Equations 9 through 12, it will be seen that these equations are based upon a "clean split" of components in each fractional distillation column, i.e., the entire amount of a given component in the column feed goes either overhead or as kettle product. Although such an assumption is virtually valid in certain separational processes, e.g., filtration, and can be sufficiently valid in certain fractional distillations, it is, of course, rarely true in many separational processes. Accordingly, a more elaborate computer is presented in FIGURE 4 which takes into account the of Equation 10 becomes $$\frac{(1+k_{103})[iC_5-k_{86}(C_2+C_3+iC_4+nC_4)+k_{89}(iC_5+nC_5+C_6+)+nC_5-k_{81}C_6+]}{C_2+-(1+k_{86})(C_2+C_3+iC_4+nC_4)+k_{89}(iC_5+nC_5+C_6+)} \tag{14}$$

relatively constant overlap of one separated component into the other, e.g., minor amounts of kettle product components in the overhead product stream.

Referring now to the computer of FIGURE 4, the computer inputs comprise terminals 53a through 53i as from the analyzer and signal storing means of FIGURE 2. Arithmetical computers 54 through 79 are likewise given numbers identical to those in FIGURE 2, since they perform the same operations in Equations 9 through 12. The additional mathematical operators 80 through 104 are provided to account for "overlap" in the separations. The $$\frac{OHP}{F} \text{ and } \frac{F_x}{F_y}$$

terms in Equations 7 and 8 will now be set forth in terms of the specific separations of Equations 9 through 12 in order to more clearly explain the refinements of this embodiment. The term $$\frac{C_2+C_3+iC_4+nC_4}{C_2+}$$

of Equation 9 becomes (13)

$$\frac{(C_2+C_3+iC_4+nC_4)(1+k_{89})-k_{89}(iC_5+nC_5+C_6+)}{C_2+}$$

wherein $k_{86}$ and $k_{89}$ are "inefficiency" constants of the separation determinal by material balance, the subscripts referring to the numeral in FIGURE 4 performing that function.

It is seen that there is now included in the numerator of the term a factor $k_{86}$ to account for losses of the light fraction into the kettle and a factor $k_{89}$ to account for gain of the heavy fraction into the overhead product. The signs (i.e., "+" and "−") are opposite to what might be at first glance expected, but it will be seen that, in solving for feed rate which will "load" a column, more of each light component, for example, must be present in the feed than will show up in the overhead product and, conversely, less heavy component must be present in the feed since none at all will theoretically show up in the overhead product, overhead product being the numerator of term (13). The term $$\frac{iC_5+nC_5}{iC_5+}$$

while the term $$\frac{C_2+}{iC_5+}$$

of Equation 10 becomes (15)

$$\frac{C_2+}{C_2+-(1+k_{86})(C_2+C_3+iC_4+nC_4)+k_{89}(iC_5+nC_5+C_6+)}$$

It is noted that the denominators of terms (14) and (15) are identical, both relating to the feed to column 2. The numerator of term (14) comprises adjusted feed to column 3, while the numerator of term (15) is feed to column 1, or total feed. The term $$\frac{C_2+C_3}{C_2+C_3+iC_4+nC_4}$$

of Equation 11 becomes (16)

$$\frac{(1+k_{83})(C_2+C_3)-k_{80}(iC_4+nC_4)}{(1+k_{86})(C_2+C_3+iC_4+nC_4)-k_{89}(iC_5+nC_5+C_6+)}$$

while the term $$\frac{C_2+}{C_2+C_3+iC_4+nC_4}$$

of Equation 11 becomes (17)

$$\frac{C_2+}{(1+k_{86})(C_2+C_3+iC_4+nC_4)-k_{89}(iC_5+nC_5+C_6+)}$$

The term $$\frac{iC_4}{iC_4+nC_4}$$

of Equation 12 becomes $$\frac{[iC_4-k_{83}(C_2+C_3)+k_{80}(iC_4+nC_4)](1+k_{92})-k_{96}[k_{86}(C_2+C_3+iC_4+nC_4)+nC_4-k_{89}(iC_5+)]}{(k_{86}+1)(C_2+C_3+iC_4+nC_4)-(k_{83}+1)(C_2+C_3)+k_{80}(iC_4+nC_4)-k_{89}(iC_5+nC_5+C_6+)} \tag{18}$$

while the term $$\frac{C_2+}{iC_4+nC_4}$$

of Equation 12 becomes $$\frac{C_2+}{(k_{86}+1)(C_2+C_3+iC_4+nC_4)-(k_{83}+1)(C_2+C_3)+k_{80}(iC_4+nC_4)-k_{89}(iC_5+nC_5+C_6+)} \tag{19}$$

The computer of FIGURE 4 is thus adapted to solve Equations 9 through 12 as modified by substitution thereis of terms (13) through (19), to give a more accurate picture of the actual separations.

The following specific example will serve to illustrate the application of the computer of FIGURE 4 to the specific separation discussed in conjunction with FIGURE 1.

EXAMPLE I

| Column conditions | Column 1 Debutanizer | Column 3 Depropanizer | Column 4 C4 Splitter | Column 2 Depentanizer |
|---|---|---|---|---|
| Temperature, top of column, ° F | 167 | 135 | 148 | 173 |
| Temperature, bottom of column, ° F | 283 | 342 | 182 | 264 |
| Pressure, top of column, p.s.i.g | 135 | 293 | 135 | 46 |
| Pressure, bottom of column, p.s.i.g | 140 | 300 | 141 | 51 |
| Diameter of column, feet | 12 | 9.5 | 13 | 8 |
| Vapor capacity of column, g.p.d | 1,700,000 | 991,844 | 2,654,000 | 753,600 |
| Reflux to feet ratio (L/F) | 1.0 | 1.1 | 4.5 | 1.0 |

STREAM COMPOSITIONS (g.p.d.)

| | Liquid volume | Column 1 | | | Column 3 | | | Column 4 | | | Column 2 | | |
|---|---|---|---|---|---|---|---|---|---|---|---|---|---|
| | | Feed | OHP | KP | Feed | OHP | KP | Feed | OHP | KP | Feed | OHP | KP |
| $C_2$ | 1.0 | 10,760 | 10,760 | | 10,760 | 10,760 | | | | | | | |
| $C_3$ | 20.0 | 215,190 | 215,190 | | 215,190 | 214,000 | 1,190 | 1,190 | 1,190 | | | | |
| $iC_4$ | 9.0 | 96,835 | 96,835 | | 96,835 | 1,190 | 95,645 | 95,645 | 94,645 | 1,000 | | | |
| $nC_4$ | 28.0 | 301,265 | 300,000 | 1,265 | 300,000 | | 300,000 | 300,000 | 1,000 | 299,000 | 1,265 | 1,265 | |
| $iC_5$ | 12.0 | 129,115 | 1,265 | 127,850 | 1,265 | | 1,265 | 1,265 | | 1,265 | 127,850 | 127,850 | |
| $nC_5$ | 13.0 | 139,875 | | 139,875 | | | | | | | 139,875 | 137,875 | 2,000 |
| $C_6^+$ | 17.0 | 182,910 | | 182,910 | | | | | | | 182,910 | 1,000 | 181,910 |
| Total | 100.0 | 1,075,950 | 624,050 | 451,900 | 624,050 | 225,950 | 398,100 | 398,100 | 96,835 | 301,265 | 451,900 | 267,990 | 183,910 |

By substitution of the above compositions and the physically-determinable values of K's and k's into Equations 9 through 12 as modified by terms (13) through (19), the following results are obtained:

$F_1' = 1,075,950$  $K_3 = 991,844$
$F_1^2 = 1,126,333$  $K_4 = 2,654,000$
$F_1^3 = 1,169,628$  $k_a = 1.0$
$F_1^4 = 1,512,254$  $k_b = 1.0$
$K_1 = 1,700,000$   $k_c = 1.1$
$K_2 = 753,600$    $k_d = 4.5$
$k_{80} = 0.002989$  $k_{89} = 0.002799$
$k_{81} = 0.010934$  $k_{92} = 0.010327$
$k_{83} = 0.005267$  $k_{96} = 0.003319$
$k_{86} = 0.002027$  $k_{103} = 0.003745$

The constants used by multipliers 54a through 54i to convert mols to gallons per day are as follows:

$53a = 9.56$   $53f = 13.69$
$53b = 10.42$  $53g = 16.0$
$53c = 12.38$  $53h = 16.0$
$53d = 11.93$  $53i = 16.0$
$53e = 13.85$

By comparing the values of $F_1'$, $F_1^2$, $F_1^3$, and $F_1^4$, it is seen that $F_1'$ is the smallest. Thus, the output signal at numeral 125 of FIGURE 3 will be proportional to $F_1'$ and will be applied to reset the index point of controller 33 in FIGURE 1. Further, this indicates that this particular feed composition, when being separated in the four fractionation columns described, will "load" column 1, with columns 2, 3 and 4 operating below capacity.

EXAMPLE II

Using the physical constants and operating conditions of Example I, a feed of the following composition is separated in the apparatus described in Example I.

| Feed component | Gallons per day | Mol fraction |
|---|---|---|
| $C_2$ | 10,850 | 0.013989 |
| $C_3$ | 290,860 | 0.344092 |
| $iC_4$ | 77,420 | 0.077089 |
| $nC_4$ | 248,260 | 0.256522 |
| $iC_5$ | 103,440 | 0.092065 |
| $nC_5$ | 110,340 | 0.099354 |
| $C_6^+$ | 151,717 | 0.116889 |
| Total | 992,887 | 1.000000 |

Substitution of these values into Equations 9 through 12 as modified by terms (13) through (19) yields the following results.

$F_1' = 1,041,581$   $F_1^3 = 992,003$
$F_1^2 = 1,294,721$  $F_1^4 = 1,710,357$

It can be seen by comparing these feeds that column 3 would be the "bottleneck" for this particular feed composition, and, hence, the feed rate to the process will be controlled in accordance therewith.

Although I have described my invention in relation to a fractionation separation, it will be clear that the principle is applicable broadly to series-connected separators. It is also clear that the apparatus disclosed is suitable, and comprises presently preferred embodiments, for carrying out the specific operation described, although I do not wish to be limited thereto. For example, my invention applies to serial filtrations, solvent extractions, absorptions, etc., and the necessary material balance equations can be solved by pneumatic in addition to electrical computers.

Referring now to FIGURE 5, where is shown a filtration process controlled in accordance with my invention. A solution containing barium and antimony ions is passed by way of conduit 126 to a precipitation tank 127. Hydrogen sulfide gas is introduced into this tank by conduit 128, while the solution is stirred in the tank. Antimony ions present are precipitated as the sulfide; the resulting suspension is passed by way of conduit 129 to a filter 130. Solid antimony sulfide is removed from the filter medium and passed by way of conduit 131 to a product discharge auger 132. The remaining solution passes by way of conduit 133 to a second stirred precipitation tank 134. Sodium sulfate is added to the tank by way of conduit 135, which causes precipitation of the barium ions as the sulfate; the resulting suspension is passed by way of conduit 136 to a filter 137. Solid barium sulfate is removed from the filter medium and passed by way of conduit 138 to a product discharge auger 139. The remaining solution is passed by way of conduit 140 to further utility.

The following example will serve to illustrate the operation of the system of FIGURE 5 in accordance with my invention.

EXAMPLE III

Feed, g.p.h. in conduit 126: 114.2
Feed composition:
    2 wt. percent antimony ions
    3 wt. percent barium ions
Auger throughput capacity:
    Auger 132—25 lbs./hr.
    Auger 139—50 lbs./hr.

Equations to be solved:

(20)
$$\frac{K_{132}}{D \cdot C_A \cdot W_A} = \text{Feed rate in gals./hr. of prevailing composition which will load auger 132}$$

and

(21)
$$\frac{K_{139}}{D \cdot C_B \cdot W_B} = \text{Feed rate in gals./hr. of prevailing composition which will load augar 139}$$

where $K_{132}$ and $K_{139}$ are throughput capacities in lbs./hr. of augers 132 and 139 respectively, or 25 and 50; D is the feed bulk density in lbs./gal., or about 8.75; $C_A$ and $C_B$ are weight fractions of antimony and barium in the feed, respectively, and in this example 0.02 and 0.03; and $W_A$ and $W_B$ are constants equal to the weight ratio of precipitated salt to ion present in the feed, or 1.4 and 1.7 respectively.

It is seen that all values in Equations 20 and 21 are constant except $C_A$ and $C_B$, which are obtained by analysis. Solving Equations 20 and 21 for the analysis stated yields rates of 102 and 112 gals./hr. respectively;

these equations are solved by a suitable computer 35 and the smaller of the two results is selected by a minimum selector such as that shown as item 124 of FIGURE 3. In this specific example, it is seen that the output resulting from Equation 20 is the smaller, and is used to control the feed rate in conduit 126. Further in this example, it can be readily computed that the existing feed rate will result in precipitation of about 28 lbs./hr. of antimony sulfide and about 51 lbs./hr. of barium sulfate as follows:

$$DC_A W_A \cdot \text{feed rate} = 8.75 \times 0.02 \times 1.4 \times 114.2 = 28$$
$$DC_B W_B \cdot \text{feed rate} = 8.75 \times 0.03 \times 1.7 \times 114.2 = 51$$

Thus, in this example, the throughput of auger 132 is controlling and the present feed rate is too great; the output of the minimum selector will thus reset the index point of the flow controller to the computed value of 102 gals./hr.

Reasonable variation and modification are possible within the scope of this disclosure, the appended claims, and the drawing of the invention, the essence of which is that there are provided method and apparatus for separating a multi-component mixture whereby the rate of feed to a series-connected separation process is controlled in response to an analysis of the feed such that that separator which has lowest throughput with the given feed composition is controlling.

I claim:

1. The method of separating a multi-component fluid mixture which comprises passing said mixture to a first separation zone, separating said mixture in said first zone to produce a first stream comprising a first group of said components and a second stream comprising a second group of said components, passing said first group to a second separation zone, separating said first group in said second zone to produce a third stream comprising a third group of said components and a fourth group of said componets, analyzing said mixture to determine the proportion of components therein, passing the results of said analyzing to a computing zone and in said computing zone computing in response to said analyzing and to known separational maximum throughput capacity limitations of said first and said second separation zones which of said zones is at the time of said analyzing limiting the separating as determined by its maximum throughput capacity, and controlling in response to said computing the rate of passing said mixture to said first separation zone.

2. The method of controlling separation of a multi-component fluid mixture which comprises passing said mixture to a first separation zone, separating said mixture in said first zone into a first and a second group of components, passing said first group to a second separation zone, separating said first group in said second zone into a third and a fourth group of components, determining the proportion of components in said mixture, passing the results of said determining to a calculating zone and in said calculating zone calculating in response to said determining and to known separational maximum throughput capacity limitations of said first and said second zones which of said zones is limiting the rate of said separation as determined by its maximum throughput capacity, and controlling in response to said calculating the rate of passing said mixture to said first zone.

3. The method of fractionating a multi-component fluid mixture which comprises passing said mixture to a first fractional distillation zone, separating said mixture in said first zone into a first group comprising lighter components and a second group comprising heavier components, passing said first group to a second fractional distillation zone, separating the thus-passed group in said second zone into a third group comprising a relatively lighter component and a fourth group comprising a relatively heavier component, analyzing said mixture, passing the results of said analyzing to a computing zone and in said computing zone computing in response to said analyzing and to predetermined physical maximum throughput capacity limitations of said first and said second fractional distillation zones which of said zones is at the time of said analyzing limiting the rate of said fractionating as determined by its maximum throughput capacity, and controlling in response to said computing the rate of passing said mixture to said first zone.

4. The method of claim 4 wherein said analyzing comprises chromatographic analyzing.

5. Apparatus for separating a multi-component mixture which comprises a first separating means, means for passing said mixture to said first separating means, second separating means, means for passing a separated stream from said first to said second separating means, means for analyzing said mixture to determine the proportions of components thereof, computing means connected to said means for analyzing and adapted to compute which of said first and said second separating means is limiting the rate of said separating in response to said analyzing means and in response to predetermined physical maximum throughput capacity limitations of said first and said second separating means, and controlling means connected to said computing means and to said means for passing and adapted to control said means for passing in response to said computing means.

6. The apparatus of claim 5 wherein said computing means comprises analog computer means.

7. The apparatus of claim 5 wherein said means for analyzing comprises chromatographic analyzer means.

8. Apparatus for separating a multi-component fluid mixture comprising first fractionation means, means for passing said mixture to said first fractionation means, second fractionation means, means for passing one of the separated streams from said first to said second fractionation means, analyzing means adapted to determine the proportion of components of said mixture, computing means connected to said analyzing means adapted to compute in response to said analyzing means and to predetermined physical maximum throughput capacity separational limitations which of said first and said second fractionation means is limiting the rate of said separating as determined by its maximum throughput capacity, and control means connected to said means for passing and adapted to control said means for passing in response to said computing means.

9. Apparatus of claim 8 wherein said computing means comprises analog computer means.

10. Apparatus of claim 8 wherein said analyzing means comprises chromatographic analyzing means.

11. The method of controlling separation of multi-component mixtures in a plurality of serially-connected separating zones which comprises passing said mixture to the first of said zones, analyzing said mixture to determine the proportion of components therein, passing the results of said analyzing to a computing zone and in said computing zone computing in response to said analyzing and to known physical maximum throughput capacity limitations of said separating zones which of said zones will limit the rate of said separation as determined by its maximum throughput capacity, and controlling the rate of said passing in response to said computing.

12. The method of separating a multi-component fluid mixture by subjecting said mixture to a plurality of serially-connected fractional distillation zones which comprises analyzing said mixture to determine proportions of components therein, passing the results of said analyzing to a computing zone and in said computing zone computing in response to said analyzing and to predetermined physical maximum throughput capacity limitations of said fractional distillation zones which of said zones will limit throughput as determined by its maximum throughput capacity with the mixture composition then prevailing, and controlling the rate of said subjecting in response to said computing.

13. The method of claim 12 wherein said analyzing comprises chromatographically analyzing.

14. The method of claim 12 wherein said computing comprises analog computing.

15. Apparatus for separating a fluid mixture which comprises a plurality of serially-connected separating means, means for passing said mixture to the first of said separating means, analyzing means adapted to determine proportions of components in said mixture, computing means adapted to determine in response to said analyzing means and to predetermined physical maximum throughput capacity constants of said separating means which one of said separating means will limit the rate of said separating as determined by its maximum throughput capacity, and control means responsive to said computing means and adapted to control said means for passing.

16. The apparatus of claim 15 wherein said analyzing means comprises a chromatographic analyzer.

17. The apparatus of claim 15 wherein said computing means comprises an analog computer.

18. The method of controlling serial separations of a mixture consisting of at least components A, B, and C wherein in a first separation zone a separation is made between A and B plus C and in a second separation zone a separation is made between B and C which comprises analyzing said mixture; producing from said analyzing signals representative of the respective fractions of said components present in the total mixture; computing with said signals and known physical maximum throughput capacity limitations of said first and said second separation zones to produce output signals representative of the rates of feeding of said mixture of the composition prevailing at the time of said analyzing which will suffice to load said first and said second separation zones; selecting the smaller of said output signals; and controlling the rate of feeding said mixture to said first separation zone in response to the signal thus selected.

19. The method of fractionating a multi-component fluid mixture which comprises passing said mixture to a first fractional distillation zone, separating said mixture in said first zone into a first group comprising lighter components and a second group comprising heavier components, passing said second group to a second fractional distillation zone, separating the thus-passed group in said second zone into a third group comprising a relatively lighter component and a fourth group comprising a relatively heavier component, analyzing said mixture, passing the results of said analyzing to a computing zone and in said computing zone computing in response to said analyzing and to predetermined physical maximum throughput capacity limitations of said first and said second fractional distillation zones which of said zones is at the time of said analyzing limiting the rate of said fractionating as determined by its maximum throughput capacity, and controlling in response to said computing the rate of passing said mixture to said first zone.

20. The method of claim 19 wherein said analyzing comprises chromatographic analyzing.

References Cited by the Examiner

UNITED STATES PATENTS

| | | | |
|---|---|---|---|
| 2,419,528 | 4/1947 | Biegel. | |
| 2,881,235 | 4/1959 | Van Pool | 196—132 |
| 2,900,312 | 8/1959 | Gilmore | 202—40 X |
| 2,900,334 | 8/1959 | Miller. | |
| 2,948,676 | 8/1960 | Hutson. | |
| 3,002,818 | 10/1961 | Berger | 196—132 X |
| 3,018,230 | 1/1962 | Morgan | 202—40 |

OTHER REFERENCES

Petroleum Refiner, Pink, vol. 38, No. 3, March 1959 (pp. 215–220 relied on).

NORMAN YUDKOFF, *Primary Examiner.*

GEORGE D. MITCHELL, *Examiner.*